(12) United States Patent
Yang

(10) Patent No.: US 11,644,728 B2
(45) Date of Patent: May 9, 2023

(54) DISPLAY PANEL AND DISPLAY DEVICE

(71) Applicant: HKC CORPORATION LIMITED, Shenzhen (CN)

(72) Inventor: Chunhui Yang, Chongqing (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/829,375

(22) Filed: Jun. 1, 2022

(65) Prior Publication Data
US 2022/0291563 A1    Sep. 15, 2022

Related U.S. Application Data

(62) Division of application No. 16/349,974, filed on May 14, 2019, now Pat. No. 11,378,857.

(51) Int. Cl.
| | |
|---|---|
| *G02F 1/1362* | (2006.01) |
| *G02F 1/1337* | (2006.01) |
| *G02F 1/1339* | (2006.01) |
| *G02F 1/1333* | (2006.01) |
| *G02F 1/1345* | (2006.01) |

(52) U.S. Cl.
CPC ...... *G02F 1/136295* (2021.01); *G02F 1/1337* (2013.01); *G02F 1/1345* (2013.01); *G02F 1/13394* (2013.01); *G02F 1/133388* (2021.01); *G02F 1/133723* (2013.01)

(58) Field of Classification Search
CPC ............. G02F 1/13394; G02F 1/13398; G02F 1/136295; G02F 1/133388; G02F 1/1345; G02F 1/1337; G02F 1/133723
See application file for complete search history.

(56) References Cited

U.S. PATENT DOCUMENTS

2012/0206684 A1* 8/2012 Lee ..................... G02F 1/1337
445/24

OTHER PUBLICATIONS

English language translation of Chinese Patent Application No. CN 102236208, published on Nov. 9, 2011; downloaded from Espacenet on Nov. 5, 2021; English language translation obtained from the Google Translate tool on website. (Year: 2011).*

* cited by examiner

*Primary Examiner* — Angela K Davison

(57) ABSTRACT

A display panel and a display device are disclosed. The display panel is divided into a display area and a non-display area. The non-display area is located at a periphery of the display area. A retaining wall structure configured to block an alignment liquid is disposed between the display area and the non-display area, and the retaining wall structure surrounds the display area and is connected end to end; the non-display area of the display panel includes a fan-out area, and the retaining wall structure includes a metal layer. The metal layer of the retaining wall structure and a metal layer of the fan-out area are formed as different layers.

13 Claims, 4 Drawing Sheets

DISPLAY PANEL AND DISPLAY DEVICE

The present application claims priority to Chinese Patent Application No. CN201821852102.6, filed with the Chinese Patent Office on Nov. 9, 2018, and entitled "DISPLAY PANEL AND DISPLAY DEVICE", which is incorporated herein by reference in its entirety.

TECHNICAL FIELD

The present application relates to the technical field of display, and in particular, to a display panel and a display device.

BACKGROUND

The statements herein merely provide background information related to the present application and do not necessarily constitute the prior art.

A liquid crystal is a crystal in a liquid state, and the orientation of liquid crystal molecules naturally dripped into a liquid crystal cell is disordered, which does not meet the liquid crystal molecule arrangement requirements of a liquid crystal cell design. Therefore, in a thin film transistor-liquid crystal display (TFT-LCD), a thin film transistor (TFT) array substrate and a color filter (CF) substrate are coated with an alignment liquid to form an alignment film configured to control the orientation of the liquid crystal molecules. Polyimide (PI) is commonly used, and the liquid crystal molecules at a PI interface are anchored and oriented by rubbing alignment or photo-alignment. Since an interface between the liquid crystal and the alignment film has a strong acting force, the liquid crystal molecules having changed the orientation are restored to an original state by viscoelasticity after an applied electric field is canceled.

A PI process in a TFT-LCD cell process has three coating methods: PI immersion, letterpress printing, and inkjet. However, PI overcoating is inevitable, that is, a PI coating boundary exceeds a design value.

SUMMARY

The present application provides a display panel and a display device which can control coating precision.

To achieve the objective, the present application provides a display panel, where the display panel is divided into a display area and a non-display area; the non-display area is located at a periphery of the display area; a retaining wall structure configured to block an alignment liquid is disposed between the display area and the non-display area, and the retaining wall structure surrounds the display area and is connected end to end.

Optionally, the non-display area includes a fan-out area and a wire-on-array area.

Optionally, the retaining wall structure is disposed in a non-wire-on-array area.

Optionally, the retaining wall structure includes a metal layer, and the retaining wall structure also includes a protective layer covering the metal layer.

Optionally, the protective layer is a passivation layer or a transparent electrode layer.

Optionally, the protective layer includes a passivation layer and a transparent electrode layer.

Optionally, the non-display area of the display panel includes a fan-out area, and the retaining wall structure includes a metal layer; and the metal layer of the retaining wall structure and a metal layer of the fan-out area are formed at different layers.

Optionally, the metal layer of the fan-out area is formed on a first metal layer, and the metal layer of the retaining wall structure is formed on a second metal layer; the fan-out area includes a plurality of first metal traces, and the retaining wall structure includes second metal traces; and the second metal layer is formed on the first metal layer.

Optionally, the metal layer of the fan-out area is formed on a second metal layer, and the metal layer of the retaining wall structure is formed on a first metal layer; the fan-out area includes a plurality of second metal traces, and the retaining wall structure includes first metal traces; and the second metal layer is formed on the first metal layer.

Optionally, the line width of each first metal trace is greater than 2.5 microns and less than 100 microns.

Optionally, metal lines of the retaining wall structure are continuous; the metal lines of the retaining wall structure are cross and pass through a plurality of fan-out area traces; and an insulating layer is disposed between the metal lines of the retaining wall structure and the plurality of fan-out area traces.

Optionally, the retaining wall structure includes a plurality of retaining wall sections; each of the retaining wall sections is respectively formed between every two adjacent fan-out area traces, and the retaining wall sections are spaced apart from each other at a position of each of the fan-out area traces to form a discontinuous retaining wall structure.

Optionally, the retaining wall structure includes at least one first retaining wall and one second retaining wall, and each first retaining wall includes a plurality of retaining wall sections; each of the retaining wall sections is respectively formed between every two adjacent fan-out area traces, and the first retaining walls are spaced apart from each other at a position of each of the fan-out area traces to form a discontinuous first retaining wall;

the second retaining wall includes metal lines, and the metal lines of the second retaining wall are continuous; the metal lines of the second retaining wall are cross and pass through the plurality of fan-out area traces; and an insulating layer is disposed between the metal lines of the second retaining wall and the plurality of fan-out area traces, where the first retaining wall is close to the display area.

Optionally, the display panel includes a first substrate and a second substrate; the first substrate and the second substrate are opposite to each other, and the first substrate is not provided with a photo spacer; the retaining wall structure is disposed in a non-display area of the first substrate; the second substrate is provided with a photo spacer, and the second substrate is provided with a photo spacer retaining wall formed by the photo spacer to block an alignment liquid.

Optionally, the first substrate is an array substrate; and the second substrate is a color filter substrate.

The present application discloses a display panel, where the display panel is divided into a display area and a non-display area; the non-display area is located at a periphery of the display area; a retaining wall structure configured to block an alignment liquid is disposed between the display area and the non-display area, and the retaining wall structure surrounds the display area and is connected end to end. The non-display area includes a fan-out area, and a metal layer of the fan-out area is a first metal layer; the first metal layer includes a plurality of first metal traces, and a metal layer of the retaining wall structure is formed on a second metal layer; the retaining wall structure includes second metal traces, and the second metal traces are continuous; the second metal traces are cross and pass through the first metal traces of the fan-out area, and an insulating layer is disposed between the first metal traces and the second metal traces.

The present application also discloses a display device including the display panel as described above.

In a TFT-LCD, a color filter (CF) substrate and a thin film transistor (TFT) array substrate are coated with a layer of alignment film (PI) configured to control the orientation of liquid crystal molecules. Since a PI process is followed by the sealant coating, if the PI process is not well controlled, the PI and the sealant may overlap, which may reduce the adhesive strength of the sealant and affect the assembly effect of the TFT substrate and the CF substrate, and have a great impact on the production stability of the display panel. In this solution, since the retaining wall structure is arranged between the display area and the non-display area, the retaining wall structure can prevent the coating of the alignment liquid from exceeding a boundary design value when the alignment liquid is applied in the display area, and the coating precision of the alignment liquid can be well controlled, so that the alignment liquid is not applied to other areas, to improve the production stability of the display panel, in addition, the retaining wall structure surrounds the display area and is connected end to end, so that the periphery of the display area is completely surrounded by the retaining wall structure. Moreover, the end-to-end joints of the retaining wall structure are connected with each other, to prevent slits from being formed in the end-to-end joints of the retaining wall structure and leading to the overflow of the alignment liquid, so that the production stability of the display panel is higher.

BRIEF DESCRIPTION OF DRAWINGS

The drawings are included to provide further understanding of embodiments of the present application, which constitute a part of the specification and illustrate the embodiments of the present application, and describe the principles of the present application together with the text description. Apparently, the accompanying drawings in the following description show merely some embodiments of the present application, and a person of ordinary skill in the art may still derive other accompanying drawings from these accompanying drawings without creative efforts.

In the accompanying drawings.

DETAILED DESCRIPTION

Figure 1:
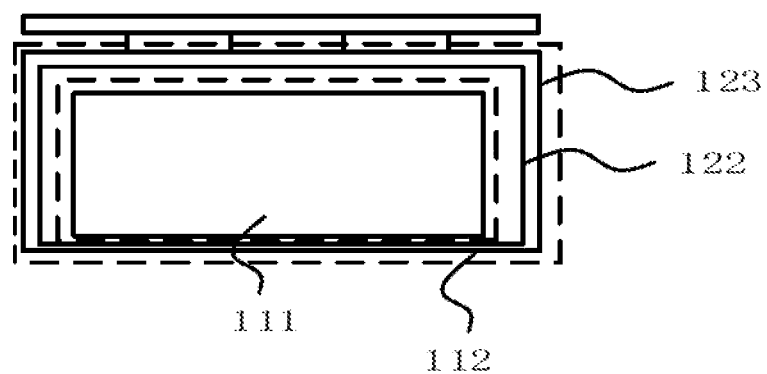
FIG. 1 is a schematic view of a structure of a display panel according to an embodiment of the present application.

It needs be understood that the terms used herein, and specific structures and functional details disclosed are merely for the purpose of describing specific embodiments and are representative. However, the present application can be specifically embodied in many alternative forms, and should not be interpreted to be limited to the embodiments described herein.

In the description of the present application, the terms such as "first" and "second" are merely for a descriptive purpose, and cannot to be understood to indicate relative importance, or implicitly indicate the number of the indicated technical features. Hence, unless otherwise noted, the features defined by "first" and "second" can explicitly or implicitly include one or more features; and "a plurality of" means two or more. The term "include" and any variations thereof are intended to cover a non-exclusive inclusion, and may cover the presence or addition of one or more other features, integers, steps, operations, elements, components and/or combinations thereof.

In addition, the terms "center", "transversal", "upper", "lower", "left", "right", "vertical", "horizontal", "top", "bottom", "inner", "outer", etc. which indicate orientation or position relationships are described based on the orientation or relative position relationships as shown in the drawings, only for the simplified description that facilitates the description of the present application, rather than indicating that the indicated device or element must have a particular orientation or be constructed and operated in a particular orientation. Therefore, these terms should not be understood as a limitation to the present application.

In addition, unless otherwise specified and defined, the terms "install", "connected with", "connected to" should be comprehended in a broad sense. For example, these terms may be comprehended as being fixedly connected, detachably connected or integrally connected; mechanically connected or electrically connected; or directly connected or indirectly connected through an intermediate medium, or in an internal communication between two elements. The specific meanings about the foregoing terms in the present application may be understood by those skilled in the art according to specific circumstances.

The present application will be described below with reference to the accompanying drawings and optional embodiments.

As shown in FIG. 1 to FIG. 8, an embodiment of the present application discloses a display panel 110, where the display panel 110 is divided into a display area 111 and a non-display area 112; the non-display area 112 is located at a periphery of the display area 111; a retaining wall structure 113 configured to block an alignment liquid is disposed between the display area 111 and a non-display area 112, and the retaining wall structure 113 surrounds the display area 111 and is connected end to end.

In a TFT-LCD, a CF substrate and a TFT substrate are coated with an alignment film (PI) configured to control the orientation of liquid crystal molecules. Since a PI process is followed by the sealant coating, if the PI process is not well controlled, the PI and the sealant may overlap, which may reduce the adhesive strength of the sealant and affect the assembly effect of the TFT substrate and the CF substrate, and have a great impact on the production stability of the display panel 110. In this solution, since the retaining wall structure 113 is arranged between the display area 111 and the non-display area 112, the retaining wall structure 113 can prevent the coating of the alignment liquid from exceeding a boundary design value when the alignment liquid is applied in the display area 111, and the coating precision of the alignment liquid can be well controlled, so that the alignment liquid is not applied to other areas, to improve the production stability of the display panel 110; in addition, the retaining wall structure 113 surrounds the display area 111 and is connected end to end, so that the periphery of the display area 111 is completely surrounded by the retaining wall structure 113. Moreover, the end-to-end joints of the retaining wall 113 are connected with each other, to prevent slits from being formed in the end-to-end joints of the retaining wall structure 113 and leading to the overflow of the alignment liquid, so that the production stability of the display panel 110 is higher.

The non-display area 112 includes a fan-out area 116 and a wire-on-array (WOA) area, and the fan-out area 116 and the WOA area are provided with retaining wall structures 113. The coating control precision of an alignment liquid is generally controlled within a certain range (0-5000 μm) away from the display area, and traces of the fan-out area 116 are formed at a boundary or in an area formed by the alignment liquid corresponding to the coating precision, and for the fan-out area 116, more attention should be paid to a design of the retaining wall structure 113.

Figure 3:
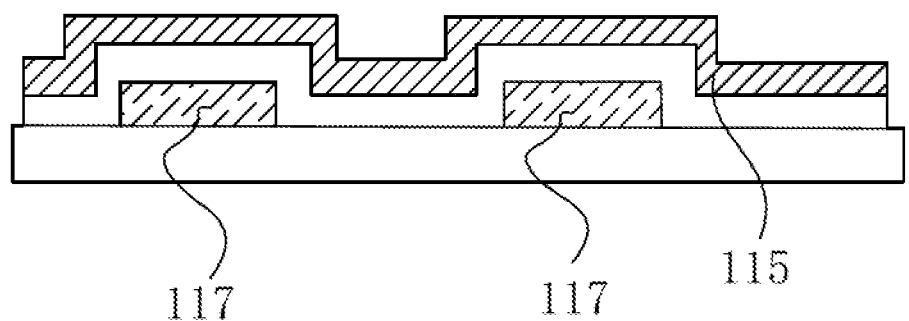
FIG. 3 is a schematic view of a cross section taken along an A-A' direction of FIG. 2.
Figure 4:
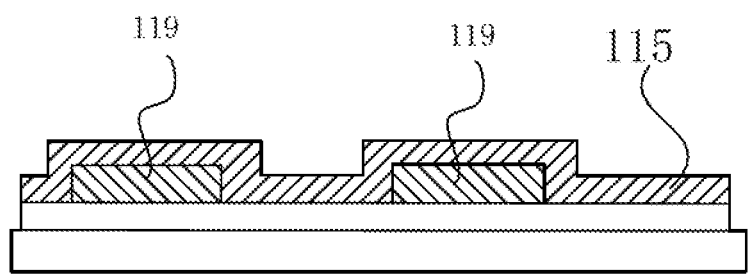
FIG. 4 is a schematic view of a cross section taken along a B-B' direction of FIG. 2.

As shown in FIGS. 3 and 4, in one or more embodiments, the retaining wall structure 113 includes a metal layer 114, and the retaining wall structure 113 further includes a protective layer 115 covering the metal layer 114. In this solution, the retaining wall structure 113 includes the metal layer 114 that conducts heat to accelerate the solidification of the alignment liquid and define a diffusion area of the alignment liquid, and it is easy to control the precision of the alignment liquid diffusion area without adding additional costs. Specifically, the protective layer 115 is a passivation layer or a transparent electrode layer, or the protective layer 115 has both the passivation layer and the transparent electrode layer simultaneously. Of course, the protective layer 115 is not limited to the passivation layer or the transparent electrode layer, as long as the metal layer 114 can be protected.

Figure 2:
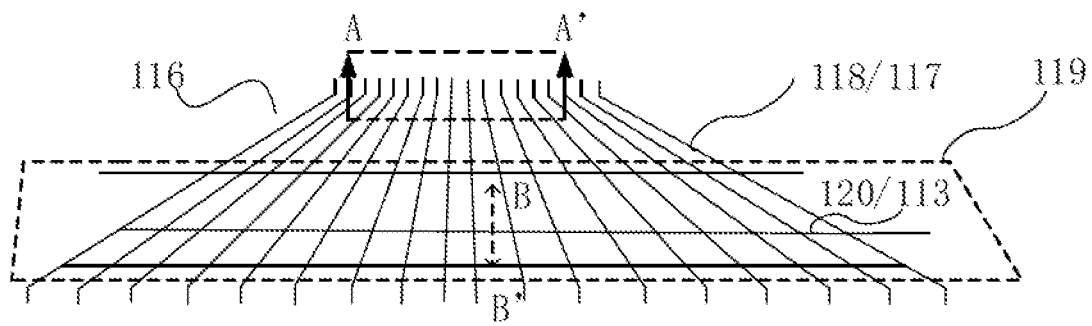
FIG. 2 is a schematic view of a retaining wall structure according to an embodiment of the present application.

As shown in FIG. 2, in one or more embodiments, the non-display area 112 of the display panel 110 includes a fan-out area 116, and the retaining wall structure 113 includes a metal layer 114; and the metal layer 114 of the retaining wall structure 113 and a metal layer of the fan-out area 116 are formed at different layers.

For a solution of disposing a photo spacer (PS) 124 on a second substrate 123 without being disposed on a first substrate 122, a retaining wall structure 113 can be formed on the first substrate 122 by the adoption of a metal layer. Since a pattern formed by the metal layer has a certain height, the retaining wall structure 113 includes the metal layer to achieve an effect of a retaining wall, so that the retaining wall may not be separately disposed on the first substrate 122, but be formed at the same time through the implementation of manufacture procedures of other structures (such as a manufacture procedure of forming each metal line pattern at a first metal layer 117 and a second metal layer 119), which saves process steps; and at the same time, the coating of a PI liquid can be prevented from exceeding the boundary of a PI design value.

As shown in FIG. 2, FIG. 3 and FIG. 4, in one or more embodiments, the metal layer of the fan-out area 116 is formed on a first metal layer 117, and the metal layer of the retaining wall structure 113 is formed on a second metal layer 119; the fan-out area 116 includes a plurality of first metal traces 118, and the retaining wall structure 113 includes second metal traces 120, and the second metal layer 119 is formed on the first metal layer 117. Metal lines of the retaining wall structure 113 are continuous; the metal lines of the retaining wall structure 113 are cross and pass through a plurality of fan-out area traces 129; and an insulating layer is disposed between the metal lines of the retaining wall structure 113 and the plurality of fan-out area traces 129.

A connection line width of the continuous metal line is 2.5 μm to 100 μm. In this solution, the retaining wall structure 113 includes second metal traces 120, and a second metal layer 119 is formed on a first metal layer 117; and heights of the second metal traces 120 are higher than those of the first metal traces 118. When the display area is coated with the alignment liquid, since the height is high, the coating precision of the alignment liquid can be controlled. In addition, the metal lines of the retaining wall structure 113 are continuous, and the retaining wall structure 113 is of a continuous structure, which has a good protection effect on the precision control of the alignment liquid.

Of course, when the metal layer of the fan-out area 116 is formed on the second metal layer 119, the retaining wall structure 113 includes first metal traces 118 of the first metal layer 117, which can also achieve a function of the retaining wall; after the second metal layer 119 is formed at the first metal layer 117, corresponding to an intersection of the fan-out area traces 129 and the retaining wall structure 113, the fan-out area traces 129 overlap on the retaining wall structure 113, which can also achieve functions of the retaining wall structure 113, as long as the fan-out area traces 129 and the retaining wall structure 113 are insulated and not conductive.

In one or more embodiments, the retaining wall structure 113 further includes a transparent electrode layer formed on the second metal layer 119, where the second metal layer 119 and the transparent electrode layer may be in direct contact and conduction with each other, or an insulating passivation layer may be disposed on the second metal layer 119, and the transparent electrode layer is disposed on the passivation layer. In this solution, the retaining wall structure 113 further includes a transparent electrode layer. The transparent electrode layer as a whole increases the height of the retaining wall structure 113, improves the efficiency of the retaining wall structure 113, and better controls the precision of the alignment liquid coating.

Figure 5:
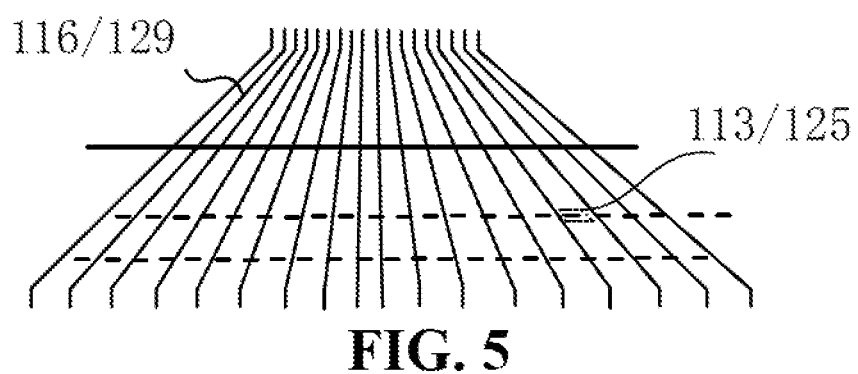
FIG. 5 is a schematic view of a retaining wall structure according to another embodiment of the present application.

As shown in FIG. 5, in an embodiment, the retaining wall structure 113 includes a plurality of retaining wall sections 125; each of the retaining wall sections 125 is respectively formed between every two adjacent fan-out area traces 129, and the retaining wall sections 125 are spaced apart from each other at a position of each of the fan-out area traces 129 to form a discontinuous retaining wall structure 113.

In this solution, the retaining wall structure 113 includes a plurality of retaining wall sections 125; each of the retaining wall sections 125 is respectively formed between every two adjacent fan-out area traces 129, and the retaining wall sections 125 are spaced apart from each other at a position of each of the fan-out area traces 129 to form a discontinuous retaining wall structure 113, which can buffer reflux of a PI liquid. If the reflux of the PI liquid affects the uniformity of a thickness of a PI film, it is unfavorable for the alignment of the alignment film and the liquid crystal, which affects the product quality.

In one or more embodiments, the retaining wall structure 113 includes metal lines, and an insulating layer is disposed between the metal lines of the retaining wall structure 113 and the plurality of fan-out area traces 129. Of course, it is also possible that the retaining wall structure 113 may not include the metal lines, and a black matrix (BM), or a color photoresist layer such as a red photoresist (R), a green photoresist (G), a blue photoresist (B), and a PS may be used as a retaining wall.

Figure 6:
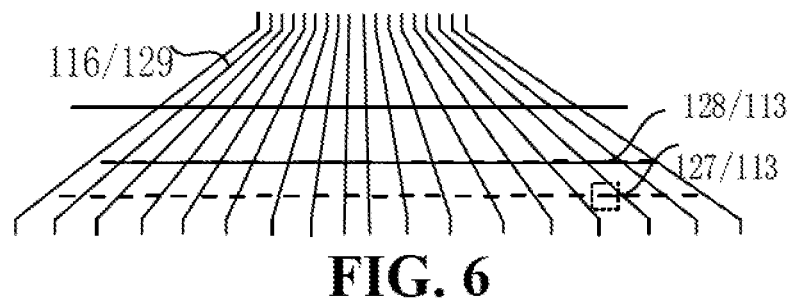
FIG. 6 is a schematic view of a retaining wall structure according to another embodiment of the present application.

As shown in FIG. 6, in one or more embodiments, the retaining wall structure 113 includes at least one first retaining wall 127 and one second retaining wall 128, and the first retaining wall 127 includes a plurality of retaining wall sections 125; each retaining wall section 125 is respectively formed between every two adjacent fan-out area traces 129, and the first retaining walls 127 are spaced apart from each other at each of the fan-out area traces 129 to form a discontinuous first retaining wall 127; the second retaining wall 128 includes metal lines, and the metal lines of the second retaining wall 128 are continuous; the metal lines of the second retaining wall 128 are cross and pass through the plurality of fan-out area traces 129; an insulating layer is disposed between the metal lines of the second retaining wall 128 and the plurality of fan-out area traces 129; where the first retaining wall 127 is close to the display area 111.

In this solution, multiple retaining wall structures 113 are provided, and the continuous structures and the discontinuous structures are alternately arranged to buffer the PI liquid reflux. Meanwhile, the retaining wall structures 113 are each of a continuous structure, which has a very good protection effect on the PI precision control.

Figure 7:
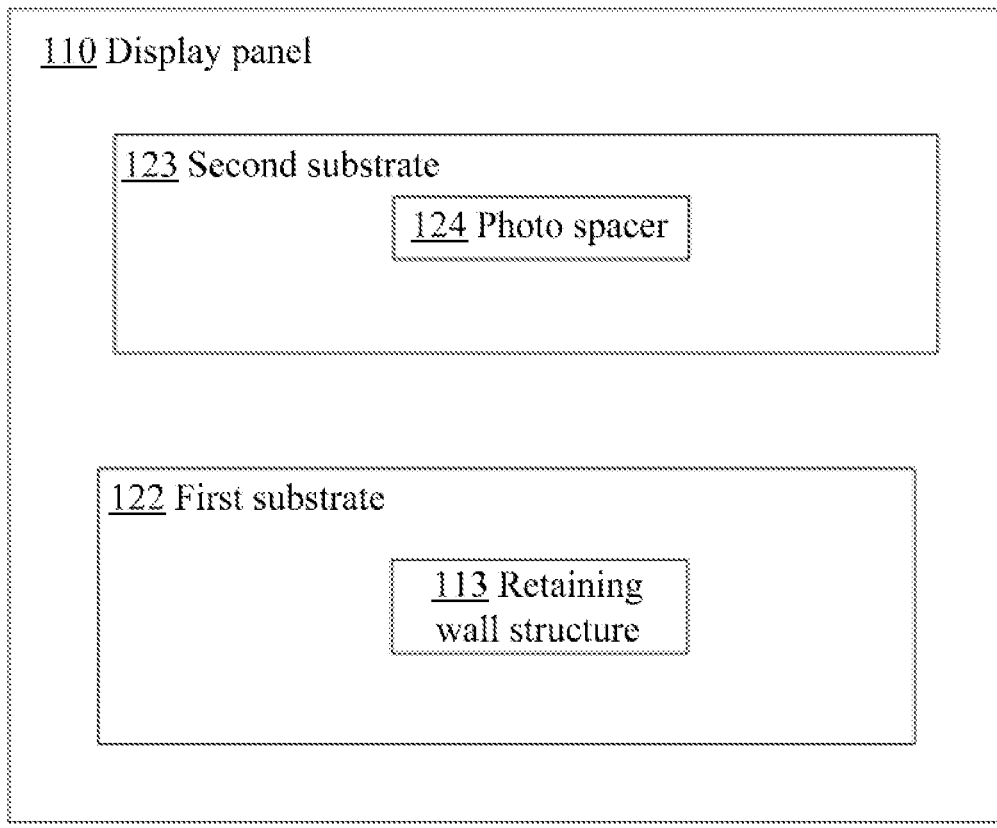
FIG. 7 is a schematic block diagram of a display panel according to an embodiment of the present application.

As shown in FIG. 7, in one or more embodiments, the display panel 110 includes a first substrate 122 and a second substrate 123; the first substrate 122 and the second substrate 123 are opposite to each other, and the first substrate 122 is not provided with a photo spacer; the retaining wall structure 113 is disposed in a non-display area 112 of the first substrate 122; the second substrate 123 is provided with a photo spacer 124, and the second substrate 123 is provided with a photo spacer retaining wall formed by the photo spacer 124 to block an alignment liquid. The first substrate 122 is an array substrate; and the second substrate 123 is a color filter substrate.

In order to alleviate a phenomenon of overcoating of the alignment liquid, namely the coating boundary of the alignment liquid exceeding a design value, in an embodiment, a photo space (PS) may be established as the retaining wall structure 113, that is, the photo space is utilized to form the retaining wall structure 113 at a position where the retaining wall structure 113 need to be arranged, which greatly alleviates the phenomenon of overcoating of the alignment liquid. In this solution, the first substrate 122 is a TFT substrate, and TFT substrate manufacture procedures include five manufacture procedures or four manufacture procedures, and there is no photo spacer manufacture procedure in the five manufacture procedures or the four manufacture procedures, so there is no photo spacer as the retaining wall structure 113. The retaining wall structure 113 is disposed in the non-display area 112 of the first substrate 122, which alleviates a phenomenon of overcoating of the alignment liquid.

As shown in FIG. 2, an embodiment of the present application also discloses a display panel 110, where the display panel 110 is divided into a display area 111 and a non-display area 112; the non-display area 112 is located at a periphery of the display area 111; a retaining wall structure 113 configured to block an alignment liquid is disposed between the display area 111 and a non-display area 112, and the retaining wall structure 113 surrounds the display area and is connected end to end. The non-display area 112 includes a fan-out area, and a metal layer of the fan-out area is a first metal layer 117; the first metal layer 117 includes a plurality of first metal traces 118, and a metal layer of the retaining wall structure 113 is formed on a second metal layer 119; the retaining wall structure 113 includes second metal traces 120, and the second metal traces are continuous; the second metal traces are cross and pass through the first metal traces 118 of the fan-out area, and an insulating layer is disposed between the first metal traces 118 and the second metal traces.

In this solution, since the retaining wall structure 113 is arranged between the display area 111 and the non-display area 112, the retaining wall structure 113 includes second metal lines and can prevent the coating of the alignment liquid from exceeding a boundary design value when the alignment liquid is applied in the display area, and the coating precision of the alignment liquid can be well controlled, so that the alignment liquid is not applied to other areas, to improve the production stability of the display panel 110; in addition, the retaining wall structure 113 surrounds the display area and is connected end to end, so that the periphery of the display area is completely surrounded by the retaining wall structure 113. Moreover, the end-to-end joints of the retaining wall 113 are connected with each other, to prevent slits from being formed in the end-to-end joints of the retaining wall structure 113 and leading to the overflow of the alignment liquid, so that the production stability of the display panel 110 is higher.

Figure 8:
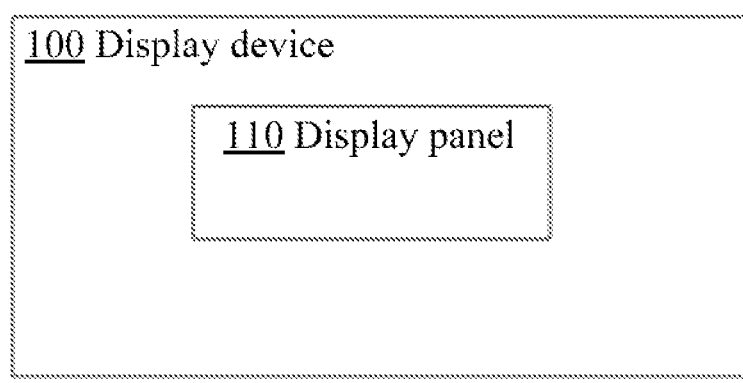
FIG. 8 is a schematic block diagram of a display device according to an embodiment of the present application.

As shown in FIG. 8, an embodiment of the present application discloses a display device 100 which includes the above display panel 110.

The technical solutions of the present application can be widely applied to various display panels, such as a twisted nematic (TN) display panel, an in-plane switching (IPS) display panel, a vertical alignment (VA) display panel, or a multi-domain vertical alignment (MVA) display panel, and of course, the display panels may also be other types of display panels, such as an organic light-emitting diode (OLD) display panel, which can all be suitable for the above solutions.

The above are detailed descriptions of the present application in conjunction with the specific optional embodiments, but the specific implementation of the present application cannot be determined as being limited to these descriptions.

For a person of ordinary skill in the art to which the present application pertains, a number of simple deductions or substitutions may also be made without departing from the concept of the present application. All these should be considered as falling within the scope of protection of the present application.

What is claimed is:

1. A display panel, wherein the display panel is divided into a display area and a non-display area; the non-display area is located at a periphery of the display area; a retaining wall structure configured to block an alignment liquid is disposed between the display area and the non-display area, and the retaining wall structure surrounds the display area and is connected end to end;

wherein the non-display area of the display panel comprises a fan-out area, and the retaining wall structure comprises a metal layer; and the metal layer of the retaining wall structure and a metal layer of the fan-out area are formed at different layers;

wherein the fan-out area comprises a plurality of fan-out area traces, and the retaining wall structure comprises a plurality of retaining wall sections; each of the retaining wall sections is respectively formed between every two adjacent fan-out area traces, and the retaining wall sections are spaced apart from each other at a position of each of the fan-out area traces to form a discontinuous retaining wall structure.

2. The display panel according to claim 1, wherein the non-display area comprises a fan-out area and a wire-on-array area.

3. The display panel according to claim 1, wherein the retaining wall structure is disposed in a non-wire-on-array area.

4. The display panel according to claim 1, wherein the metal layer of the fan-out area is formed as a second metal layer, and the metal layer of the retaining wall structure is formed as a first metal layer; and the second metal layer is formed over the first metal layer.

5. The display panel according to claim 1, wherein the retaining wall structure comprises a metal layer and a protective layer covering the metal layer.

6. The display panel according to claim 5, wherein the protective layer is a passivation layer or a transparent electrode layer.

7. The display panel according to claim 5, wherein the protective layer comprises a passivation layer and a transparent electrode layer.

8. The display panel according to claim 1, wherein the metal layer of the fan-out area is formed as a first metal layer, and the metal layer of the retaining wall structure is formed as a second metal layer; and the second metal layer is formed over the first metal layer.

9. The display panel according to claim 8, wherein a line width of each first metal trace is greater than 2.5 microns and less than 100 microns.

10. The display panel according to claim 1, wherein the display panel comprises a first substrate and a second substrate; the first substrate and the second substrate are opposite to each other, and the first substrate is not provided with a photo spacer; the retaining wall structure is disposed in a non-display area of the first substrate;

the second substrate is provided with a photo spacer, and the second substrate is provided with a photo spacer retaining wall formed by the photo spacer to block the alignment liquid.

11. The display panel according to claim 10, wherein the first substrate is an array substrate, and the second substrate is a color filter substrate.

12. A display panel, comprising a display area and a non-display area; the non-display area is located at a periphery of the display area;

a retaining wall structure configured to block an alignment liquid is disposed between the display area and the non-display area, and the retaining wall structure surrounds the display area and is continuous and is connected end to end;

the non-display area comprises a fan-out area, and a metal layer of the fan-out area is a first metal layer; the first metal layer comprises a plurality of first metal traces, and a metal layer of the retaining wall structure is formed as a second metal layer; the retaining wall structure comprises a plurality of second metal traces, which are each continuous; the plurality of second metal traces cross over the plurality of first metal traces of the fan-out area, and an insulating layer is disposed between the plurality of first metal traces and the plurality of second metal traces;

wherein the fan-out area comprises a plurality of fan-out area traces, and the retaining wall structure comprises a plurality of retaining wall sections; each of the retaining wall sections is respectively formed between every two adjacent fan-out area traces, and the retaining wall sections are spaced apart from each other at a position of each of the fan-out area traces to form a discontinuous retaining wall structure.

13. A display device, comprising a display panel, the display panel comprising a display area and a non-display area; the non-display area is located at a periphery of the display area; a retaining wall structure configured to block an alignment liquid is disposed between the display area and the non-display area, and the retaining wall structure surrounds the display area and is connected end to end;

wherein the non-display area of the display panel comprises a fan-out area, and the retaining wall structure comprises a metal layer; and the metal layer of the retaining wall structure and a metal layer of the fan-out area are formed at different layers;

wherein the fan-out area comprises a plurality of fan-out area traces, and the retaining wall structure comprises a plurality of retaining wall sections; each of the retaining wall sections is respectively formed between every two adjacent fan-out area traces, and the retaining wall sections are spaced apart from each other at a position of each of the fan-out area traces to form a discontinuous retaining wall structure.

\* \* \* \* \*